(12) United States Patent
Hansen

(10) Patent No.: US 9,927,317 B2
(45) Date of Patent: Mar. 27, 2018

(54) IONIZATION PRESSURE GAUGE WITH BIAS VOLTAGE AND EMISSION CURRENT CONTROL AND MEASUREMENT

(71) Applicant: MKS Instruments, Inc., Andover, MA (US)

(72) Inventor: Douglas C. Hansen, Boulder, CO (US)

(73) Assignee: MKS Instruments, Inc., Andover, MA (US)

( * ) Notice: Subject to any disclaimer, the term of this patent is extended or adjusted under 35 U.S.C. 154(b) by 270 days.

(21) Appl. No.: 14/795,729

(22) Filed: Jul. 9, 2015

(65) Prior Publication Data

US 2017/0010172 A1 Jan. 12, 2017

(51) Int. Cl.
*G01L 21/32* (2006.01)
*G01L 21/34* (2006.01)
*G01L 21/30* (2006.01)

(52) U.S. Cl.
CPC .............. *G01L 21/32* (2013.01); *G01L 21/30* (2013.01); *G01L 21/34* (2013.01)

(58) Field of Classification Search
CPC ......... G01L 21/30; G01L 21/32; G01L 21/34; H01J 41/02; H01J 41/06; H01J 41/04; G01N 27/62
USPC .............. 324/459–470; 313/309, 336, 363.1; 250/427, 389; 315/135, 107, 136, 405
See application file for complete search history.

(56) References Cited

U.S. PATENT DOCUMENTS

| | | | | |
|---|---|---|---|---|
| 4,035,720 A | * | 7/1977 | Harvey | ............... G01L 21/32 315/108 |
| 4,143,318 A | | 3/1979 | Harvey | |
| 4,158,794 A | * | 6/1979 | Sandler | ................... G09G 3/06 315/105 |
| 4,404,524 A | * | 9/1983 | Yamamoto | ........... G01N 27/626 324/459 |
| 5,097,475 A | * | 3/1992 | Perzl | .................. H01S 3/09713 372/86 |
| 5,250,906 A | | 10/1993 | Bills et al. | |
| 5,608,384 A | | 3/1997 | Tikijian | |

(Continued)

FOREIGN PATENT DOCUMENTS

GB 2105047 3/1983
JP 2000241281 9/2000

(Continued)

OTHER PUBLICATIONS

Notification of International Search Report and The Written Opinion of the International Searching Authority dated Sep. 1, 2016 for International Application PCT/US2016/032070 entitled "Ionization Pressure Gauge With Bias Voltage and Emission Current Control and Measurement".

(Continued)

*Primary Examiner* — Thang Le

(74) *Attorney, Agent, or Firm* — Hamilton, Brook, Smith & Reynolds, P.C.

(57) ABSTRACT

Devices and corresponding methods are provided to operate a hot cathode ionization pressure gauge (HCIG). A transistor circuit can be configured to pass the electron emission current with low input impedance and to control cathode bias voltage. Emission current and cathode bias voltage can be controlled independently of each other, without a servo settling time. HCIGs can be calibrated with respect to leakage current.

24 Claims, 6 Drawing Sheets

(56) References Cited

U.S. PATENT DOCUMENTS

| | | |
|---|---|---|
| 5,801,535 A | 9/1998 | Bills |
| 6,198,105 B1 * | 3/2001 | Bills .................. H01J 41/04 |
| | | 250/397 |
| 6,351,188 B1 | 2/2002 | Masahiro |
| 6,515,482 B2 | 2/2003 | Kawasaki |
| 6,756,785 B2 | 6/2004 | Peacock et al. |
| 6,853,232 B2 | 2/2005 | Sanders et al. |
| 7,295,015 B2 | 11/2007 | Arnold |
| 7,352,187 B2 | 4/2008 | Knapp et al. |
| 7,398,070 B2 | 7/2008 | Yamamoto et al. |
| 7,429,863 B2 | 9/2008 | Carmichael et al. |
| 7,741,852 B2 | 6/2010 | Watanabe et al. |
| 8,063,667 B2 | 11/2011 | Tomita |
| 8,288,715 B2 | 10/2012 | Nakajima et al. |
| 8,604,821 B2 | 12/2013 | Sugiura et al. |
| 8,648,604 B2 | 2/2014 | Brucker |
| 8,686,733 B2 | 4/2014 | Brucker |
| 8,749,276 B2 | 6/2014 | Nakazawa |
| 8,947,098 B2 | 2/2015 | Carmichael et al. |
| 8,957,709 B2 | 2/2015 | Itabashi et al. |
| 2009/0218948 A1 * | 9/2009 | Nakazato ............ H01J 25/34 |
| | | 315/3 |
| 2010/0133429 A1 * | 6/2010 | Nakajima ........... H01J 49/0031 |
| | | 250/282 |
| 2010/0231266 A1 | 9/2010 | Kishor |

FOREIGN PATENT DOCUMENTS

| | | |
|---|---|---|
| JP | 10213508 | 9/2010 |
| WO | WO 2017/007531 A1 | 1/2017 |

OTHER PUBLICATIONS

Saeki, H., et al., "Hot-cathode-ionization-gauge system with a self-compensating circuit for errors caused by an external-electron source," *Rev. Sci. Instrum.*, 75, 5152 (2004).

Sikora, J., "Dual Application of a Biasing System to an Electron Source with a Hot Cathode," *Meas. Sci. Technol.*, 15: N10 (2004).

Flaxer, E., "Programmable Smart Electron Emission Controller for Hot Filament," *Rev. Sci. Instrum.*, 82, 025111 (2011).

Sikora, J. and Halas, S., "A Novel Circuit for Independent Control of Electron Energy and Emission Current of a Hot Cathode Electron Source," *Rapid Communications in Mass Spectrometry*, 25(6): 689-692 (2011).

* cited by examiner

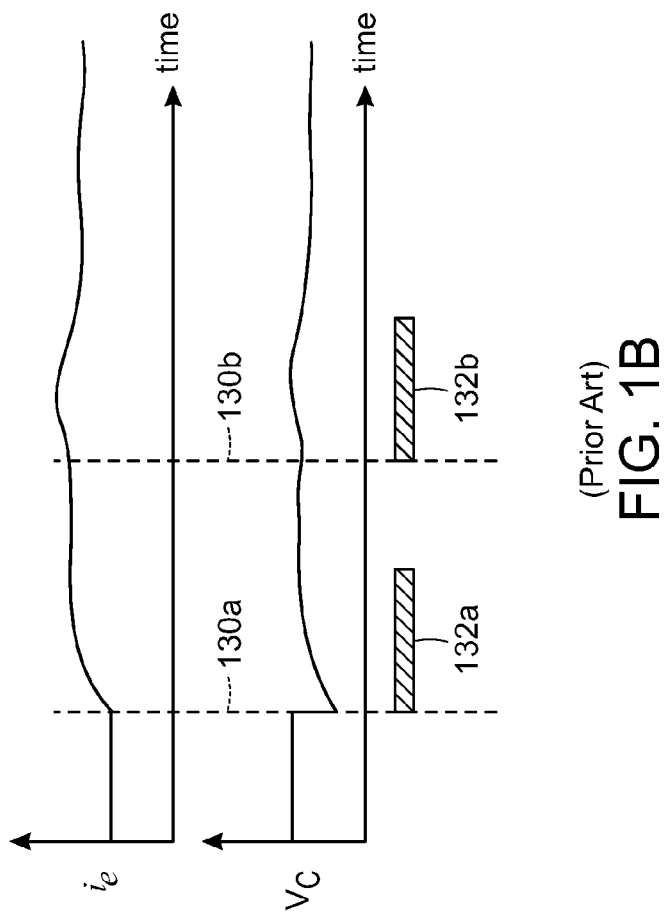
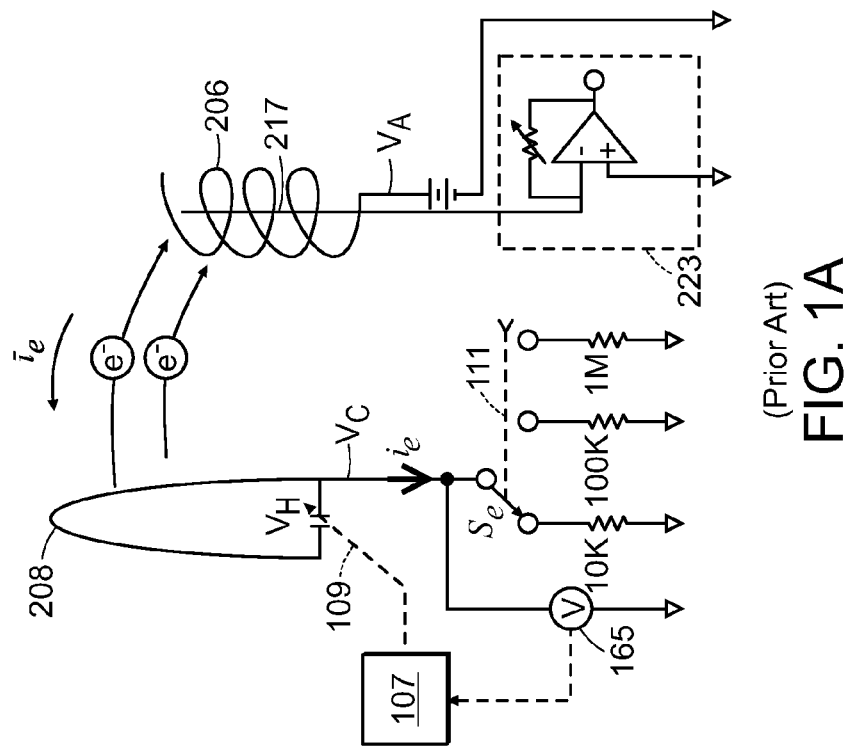
FIG. 1B
(Prior Art)
FIG. 1A
(Prior Art)

IONIZATION PRESSURE GAUGE WITH BIAS VOLTAGE AND EMISSION CURRENT CONTROL AND MEASUREMENT

BACKGROUND

Ionization vacuum pressure gauges can be used in a wide variety of applications such as semiconductor manufacturing, thin film deposition, high energy physics, ion implantation, and space simulation. Ionization gauges can include both cold cathode ionization gauges (CCIGs) and hot cathode ionization gauges (HCIGs), and some example HCIG designs include Bayard-Alpert (BA), Schulz-Phelps, and triode gauges. The sensor of a typical hot cathode ionization vacuum pressure gauge includes a cathode (the electron source, also called the filament), an anode (also called the grid), and an ion collector electrode. For the BA gauge, the cathode is located radially outside of an ionization space (anode volume) defined by the anode. The ion collector electrode is disposed within the anode volume. Electrons travel from the cathode toward and through the anode, and are eventually collected by the anode. However, in their travel, the electrons impact molecules and atoms of gas, constituting the atmosphere whose pressure is to be measured, and create ions. The ions created inside the anode volume are attracted to the ion collector by the electric field inside the anode. The pressure P of the gas within the atmosphere can be calculated from ion and electron currents by the formula $P=(1/S)(i_i/i_e)$, where S is a scaling coefficient (gauge sensitivity) with the units of 1/torr and is characteristic of a particular gauge geometry, electrical parameters, and pressure range; and $i_i$ is the ion current and $i_e$ is the electron emission current.

The cathode is heated by current flow initiated by a voltage source to cause the electron emission. The voltage source is controlled by a servo to maintain a desired electron emission current with a fixed cathode bias voltage of, for example, +30 volts. The voltage differential between the cathode bias voltage and the cathode bias voltage of the anode determines the energy of the emitted electrons as they enter the ionization volume. In turn, the energy of electrons affects the ionization current, so accuracy of the gauge depends on precise control of cathode bias voltages. The magnitude of electron emission current is determined by heating power applied within the cathode.

Ionization gauges typically include several electrical feedthroughs with connection pins (each sensor electrode is fabricated with an electrode connection post which is connected to a feedthrough electrical connection pin or conductor) extending through a header housing to provide power to, and receive signals from, the sensor. Electrical insulators can be provided between the feedthrough pins and header housing and other sensor components to maintain operational safety and signal integrity and prevent electrical currents from leaking from feedthrough pins to the header housing as connected to the gauge envelope.

SUMMARY

Servo control of the cathode heating current in hot cathode ionization gauges (HCIGs) can be problematic for several reasons. The cost and complexity of a high performance servo circuit can be high. Moreover, when electron emission current settings are changed, or when pressure in the gauge changes, cathode bias voltage is affected, because electron emission current and cathode bias voltage are coupled (one affects the other) in a traditional instrument design. Following a change in pressure or electron emission current, pressure measurements are typically unavailable during a servo settling time (dead time) that can last as long as 3 seconds. Dead time refers to a transient condition in which the filament cathode bias voltage has wandered from the desired nominal value (where the instrument calibration is valid), so pressure measurements are therefore uncalibrated and inaccurate. Thus, servo control leads to intervals of gauge inaccuracy or unuseability.

Furthermore, the effectiveness of electrical feedthrough insulators can be compromised by conductive contamination that can build up on the feedthrough insulators of ionization gauges such as HCIGs, which will now be described in detail. Contaminants can form an electrically conductive path between the feedthrough pins (conductors) and the header housing of an HCIG sensor, allowing a portion of the sensor signal currents to flow across the feedthrough insulators. These leakage currents can cause undesirable effects ranging from inaccurate pressure measurement to complete sensor failure. For example, leakage from cathode electrical feedthroughs can lead to incorrect electron emission current measurements and incorrect pressure measurements. Furthermore, it is desirable to maintain lower electron emission currents, e.g., below 20 microamperes ($\mu$A) to extend cathode lifetime. However, when leakage currents become sufficiently large with respect to the electron emission current or other signal currents, it becomes necessary to operate an HCIG cathode at higher electron emission currents in order to maintain pressure measurement accuracy, which reduces cathode lifetime. Furthermore, anode feedthrough insulators can also become contaminated, particularly during degassing procedures in which anode structures are heated. In addition to cathode and anode feedthrough insulators, other feedthrough insulators such as ion collector feedthrough insulators can also become contaminated and compromise sensor operation.

In accordance with embodiments of the invention, devices and methods are provided for setting electron emission current and cathode bias voltage uncoupled from each other, which also eliminates the dead times that are characteristic of the traditional servo-based measurement method. Furthermore, embodiment devices and methods can be used to remove the effects of leakage currents from pressure measurements, with an HCIG remaining in its normal use environment, leading to more reliable pressure measurements and longer gauge service intervals. Embodiments can provide improved pressure measurement accuracy, continuous adjustability of electron emission current over a wide range, faster electron emission current control without dead times, and faster response to pressure changes, as well as reduced manufacturing cost.

An ionization pressure gauge, and corresponding method, may include a cathode configured to be heated to emit electrons with an electron emission current. The ionization pressure gauge can also include a transistor circuit configured to pass the electron emission current with low input impedance and to control cathode bias voltage. The low input impedance can be substantially zero so that electron emission current can be sensed in the transistor circuit without affecting cathode bias voltage. The electron emission current can be passed to a current measurement circuit, which can include a current sensor. The ionization pressure gauge can also include a variable heating power source that variably heats the cathode.

The transistor circuit can control cathode bias voltage independent of magnitude of the electron emission current. For example, it may include a field effect transistor (FET)

that passes the electron emission current between source and drain with near zero input impedance while controlling gate voltage to independently control cathode bias voltage. Cathode bias voltage can be equal to a voltage applied to a gate of the FET plus an offset voltage of the FET, and a gate of the FET can be electrically connected to a variable voltage source to variably control cathode bias voltage. The electron emission current passed from source to drain can be sensed without affecting the cathode bias voltage. The transistor circuit may be electrically connected to a leakage test current source to enable current flow through the transistor with the cathode electron emission current at zero to provide current offset for accurate electron emission current sensing. The leakage test current source can include a resistance coupled to an anode bias voltage supply. A leakage current range selection switch may be configured to switch a current range of the leakage test current source in accordance with a level of leakage current.

The ionization pressure gauge can include a circuit that detects an offset of a transistor in the transistor circuit, and the circuit that detects the offset can include a diode electrically connected to the transistor circuit.

The ionization pressure gauge can include a microcontroller that can calculate a difference between electron emission current measured with the cathode heated and electron emission current measured with the cathode unheated, where the difference can be used for calibration of the ionization pressure gauge with respect to a leakage current. The microcontroller can also have control signals electrically connected to a cathode heating power source, a cathode bias voltage control input of the transistor circuit, and a leakage current range selector switch. The microcontroller can also include an electrical input electrically connected to a current sensor to measure the cathode electron emission current.

A method of operating an ionization pressure gauge, and corresponding device, can include heating a cathode to emit electrons with an electron emission current, controlling cathode bias voltage via a transistor circuit, and passing the electron emission current of the cathode via the transistor circuit with low input impedance. The low input impedance can be substantially zero. Passing the electron emission current can be done to a current measuring circuit, which can include a current sensor. Controlling cathode bias voltage can include applying a variable voltage source to a gate of the FET. The cathode bias voltage can be controlled independent of magnitude of the electron emission current. Heating the cathode can include adjustable heating to emit the electrons with a user-selected electron emission current.

The method can include calibrating the ionization pressure gauge for a leakage current by passing a leakage test current through the transistor circuit with the electron emission current set to zero. The method can include calibrating the ionization pressure gauge for a leakage current by using a difference between electron emission current measured with the cathode heated and electron emission current measured with the cathode unheated. The leakage test current can be passed through a resistance electrically coupled to an anode bias supply and switched in accordance with a level of leakage current.

The method can include outputting control signals from a microcontroller to a cathode heating power source and a cathode bias voltage control input of the transistor circuit. The method can further include outputting a control signal from the microcontroller to a leakage current range selector switch in the transistor circuit. The method can also include inputting an electrical signal from a current sensor in the transistor circuit to the microcontroller.

The transistor circuit can include a field effect transistor (FET) that passes the electron emission current. Cathode bias voltage can be equal to a voltage applied to a gate of the FET plus an offset voltage of the FET. The method can include calibrating the transistor circuit by detecting an offset of a transistor in the transistor circuit, and calibrating the transistor circuit can include using a diode. A diode can be electrically connected to a transistor in the transistor circuit and used to facilitate measurement of the offset of the transistor. A current sensor can be used to measure the electron emission current through the transistor in the transistor circuit.

The method can also include changing the electron emission current from one value to another without dead time in pressure measurement.

An ionization pressure gauge can include means for heating a cathode to emit electrons with an electron emission current, means for controlling cathode bias voltage via a transistor circuit, and means for passing the electron emission current via the transistor circuit with low input impedance.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1A is a schematic diagram illustrating an existing Bayard-Alpert (BA) hot cathode ionization gauge (HCIG).

FIG. 1B includes graphs of electron emission current and cathode bias voltage for a cathode in FIG. 1A.

DETAILED DESCRIPTION

Figure 2A:
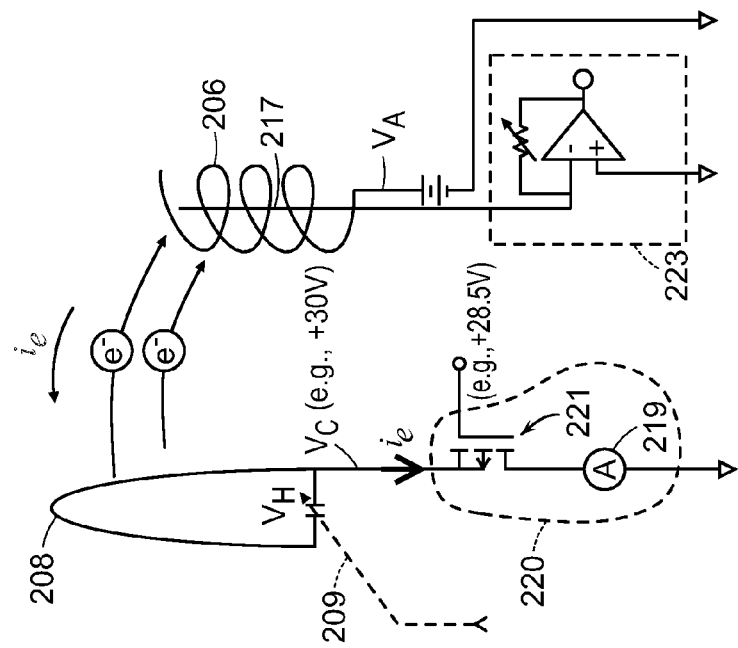
FIG. 2A is a schematic diagram illustrating an embodiment HCIG incorporating a field effect transistor (FET) circuit to pass electron emission current.

A description of example embodiments of the invention follows.

Hot cathode ionization vacuum pressure gauges (HCIGs) are used in a wide variety of applications such as semiconductor manufacturing, thin film deposition, high-energy physics, ion implantation, and space simulation. Many of these applications require high gauge reliability, low failure rates, and good pressure measurement accuracy over many orders of magnitude of pressure. Furthermore, many of these applications require accurate pressure measurements to be repeated at small time intervals and can be intolerant of servo settling times for controlling electron emission current control loop of the HCIG. With these considerations in mind, increasing the capacity of HCIGs to report very accurate pressure measurements at small time intervals without regard to control loop settling and over long lifetimes is very important.

FIG. 1A illustrates a typical Bayard-Alpert (BA) HCIG. The general principles of operation of such a gauge, as described hereinabove, are described in U.S. Pat. Nos. 7,295,015 and 7,429,863, for example, which are incorporated herein by reference in their entirety. A cathode 208 is configured to be heated by a current supplied by a cathode heater power supply $V_H$. The cathode heater power supply $V_H$ is controlled by a servo 107 by means of a control signal 109. The cathode 208 is held at a cathode bias voltage $V_C$, which can be +30 V, for example. Measurements are valid and calibrated when a voltage sensor 165, which monitors the cathode bias voltage $V_C$, reads the designated operating cathode bias voltage (e.g., +30V).

When electrically heated, the cathode 208 emits electrons e⁻ toward an anode 206. This electron emission is defined by an electron emission current $i_e$, an equivalent positive current flow in a direction opposite the electron flow. As shown in FIG. 1A, the anode can be configured as a cylindrical wire grid (anode grid), defining an anode volume (ionization volume). An ion collector electrode 217 is disposed within the ionization volume. The anode bias voltage accelerates the electrons e⁻ away from the cathode towards and through the anode 206. The anode is held at an anode bias voltage $V_A$, which is typically +180V. Eventually, all electrons emitted from the cathode are collected by the anode. In their travel, the energetic electrons impact gas molecules and atoms that may be present, creating positive ions. The positive ions are then urged to the ion collector electrode 217 by an electric field created in the anode volume. The electric field can be created by the anode, which can be maintained at +180V, for example, and an ion collector, which can be maintained at ground potential, for example. A collector current is then generated in the ion collector, and a pressure of the gas within the ionization volume can be calculated from the ion current. The ion collector 217 is connected to an electrometer (transimpedance amplifier picoammeter) 223 that measures the ion collector current and is generally operated at virtual ground.

The purpose of the servo 107 is to hold the cathode bias voltage V at the bottom of the cathode at precisely +30V. If the voltage $V_C$ drops below +30V, then the servo 107 increases cathode heating power, which increases electron flow between the cathode 208 and anode 206 and pulls up voltage at the bottom of the cathode. On the other hand, if the voltage $V_C$ rises above +30V, the servo 107 decreases cathode heating power, which decreases electron flow and allows the voltage $V_C$ to drop. At a given cathode bias voltage $V_C$, the amount of electron emission current $i_e$ that will flow at the servo equilibrium can be selected by a switch $S_e$. The optimum electron emission current depends on gas pressure, desired cathode lifetime, measurement accuracy, etc. The switch $S_e$ is controlled by a command signal 111 from the microcontroller (not shown). In the left most switch position, the system will be valid and calibrated when the electron emission current $i_e$=+30V/101 kΩ=3 mA. The other electron emission current choices, corresponding to the other switch positions, are +30V/100 kΩ=0.3 mA and +30V/1 MΩ=30 μA, respectively.

There are several disadvantages of existing HCIGs such as the one shown in FIG. 1A. First, the switch $S_e$ has only a finite number of positions. At any given switch position, the electron emission current is still usually far from the optimum tradeoff between measurement accuracy and gauge life. It is desirable to maintain electron emission currents below 20 microamperes (μA), for example, to extend cathode lifetime. However, in the presence of leakage currents, the actual electron emission current may be unknown, and an HCIG cathode must be operated at sufficiently high electron emission current that exceeds the leakage currents and maintains pressure measurement accuracy. Furthermore, the servo 107 typically required to be relatively complicated and expensive in order to minimize dead times and provide desired accuracy. Moreover, any real servo implementation has a non-zero settling time and control error, so the actual value of cathode bias voltage $V_C$ often deviates significantly from +30 V.

FIG. 1B illustrates effects of the non-zero settling time of the servo 107 in FIG. 1A. The top graph of FIG. 1B illustrates electron emission current $i_e$ over time, while the bottom graph of FIG. 1B illustrates cathode bias voltage $V_C$ over time. As illustrated in the top graph, switch $S_e$ changes position at a time 130a, which immediately causes the cathode bias voltage $V_C$ to drop. The servo 107 will eventually cause the voltage $V_C$ to rise again (by increasing the cathode heating power, which increases electron emission current), but this requires a time interval 132a (dead time), during which pressure measurements are not available. The settling time 132a can be up to 3 seconds, for example, which is the industry standard settling time. This behavior is often unacceptable, as some HCIG users demand valid pressure updates every 25 ms, for example. As also illustrated in FIG. 1B, at time 130b, a gas pressure in the HCIG can change quickly, causing both the electron emission current $i_e$ and the cathode bias voltage $V_C$ to rise or fall temporarily. Over the time period 132b, measurements of pressure are likewise invalid. As illustrated in FIG. 1B, in traditional HCIGs, electron emission current and cathode bias voltage $V_C$ are "coupled," or one affects the other.

Figure 1C:
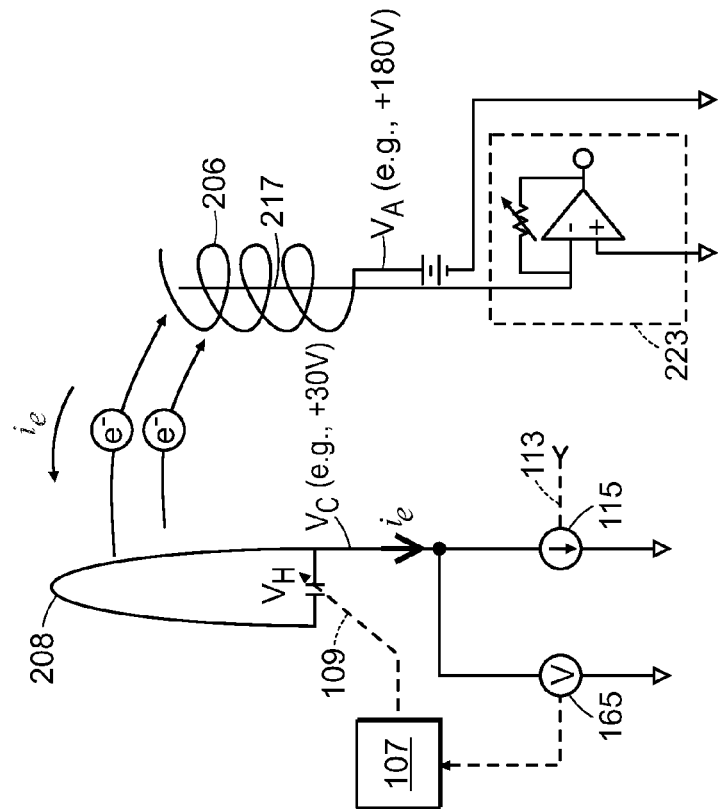
FIG. 1C is a schematic diagram illustrating the existing BA HCIG of FIG. 1A with a variable electron emission current source.

FIG. 1C illustrates an alternative existing approach to electron emission current control. In the schematic diagram shown in FIG. 1C, the switch $S_e$ and group of resistors are replaced by a variable current source 115. The current source 115 is controlled by a command 113 from a microcontroller (not shown). This solves the problem of being limited to a small number of discrete pre-selected electron emission current choices, and the electron emission current can thus be any value.

However, the design architecture of FIG. 1C introduces a severe problem. The node at the bottom of the cathode 208 has approximately infinite impedance to ground, resulting in cathode bias voltage $V_C$ that is exceedingly sensitive to cathode power and electron emission current. The servo 107 becomes extremely complicated, less accurate, and potentially unstable. The servo 107 can take a very long time to settle. Thus, the advantage of having the current source 115 adjustable comes with significant tradeoffs in circuit stability and reliability.

In accordance with embodiments of the current invention, the problems associated with coupling or dependency between the electron emission current and cathode bias voltage can be overcome. A transistor circuit can be used to control electron emission current and cathode bias voltage independently. Such a transistor circuit can pass electron emission current with very low input impedance while controlling cathode bias voltage independent of electron emission current. The servo 107, with the accompanying settling times shown in FIGS. 1A-1C, can be eliminated to provide pressure measurements that are continuously valid regardless of gas pressure or electron emission current. Furthermore, some embodiments can provide for mitigation of leakage currents, making pressure measurements more accurate over a longer gauge lifetime.

FIG. 2A is a schematic diagram illustrating an HCIG having a transistor circuit 220 to pass electron emission current with low input impedance and to control cathode bias voltage. The transistor circuit 220 of the HCIG illustrated in FIG. 2A includes both a common-gate metal oxide semiconductor FET (MOSFET) 221 and a current sensor 219 that replace the switch $S_e$, voltage sensor 165, and servo 107 in FIG. 1A. The current sensor 219 can be an ammeter or any current-sensing device or circuit, for example. In other embodiments, the transistor circuit 220 includes additional electrical components besides the single MOSFET 221 and current sensor 219.

A command signal 209 from a microcontroller (not shown) variably controls the variable cathode heating power supply $V_H$ to variably heat the cathode. The command signal 209 also replaces the control signal 109 from the servo 107 in FIG. 1A. The microcontroller, which is described further in the description of FIG. 3A, thus provides the control signal 209, electrically connected to the cathode heating power source $V_H$, to control cathode heating power. The current sensor 219 measures the electron emission current through the transistor 221. The output from that sensor fed to the microcontroller can be used to control electron emission current through signal 209. Unlike the servo control of FIGS. 1A and 1C, the feedback is from sensed electron emission current to control electron emission current, which is independent of cathode bias voltage, rather than from sensed cathode bias voltage.

As used herein, "low input impedance" denotes an impedance small enough that changes in electron emission current do not change the cathode bias voltage significantly. For example, the cathode bias voltage tolerance can be ±1.0 V in order to provide a desired measurement accuracy, and the maximum expected electron emission current can be 10 µA. In that case, the transistor circuit can provide the desired benefits if the input impedance is smaller than about 1.0V/10 µA=100 kΩ. The input impedance of the transistor circuit would be considered "substantially zero" if it is less than the value calculated above, such as the input impedance of a typical FET. For example, substantially zero input impedances on the order of 1000Ω can be achieved with circuits such as those illustrated herein. Furthermore, the transistor circuit illustrated in FIG. 2A can be further improved by adding a circuit that senses or estimates FET offset voltage and cancels it. Such improvements can further reduce effective input impedance to substantially zero input impedances around 1-100Ω range. Input impedance of a transistor circuit can vary widely and can depend upon emission current, particular choice of transistor in the transistor circuit, circuit complexity, etc.

In FIG. 2A, the electron emission current $i_e$ flows through the common-gate MOSFET amplifier transistor 221 that passes the cathode electron emission current between its emitter and collector reference terminals. The voltage between the emitter and the base control terminal may have a nominal voltage of approximately 1.5 V. Thus applying a fixed voltage (here, +28.5 V) to the gate yields a nominal voltage $V_C$ of +30 V at the base of the cathode that is insensitive to the amount of electron emission current $i_e$ that flows from the source to the drain. Thus, the electron emission current $i_e$ and cathode bias voltage $V_C$ are "uncoupled" and independent. In other words, the transistor circuit controls cathode bias voltage independent of magnitude of the electron emission current. Further, because of the low input impedance at the source, the electron emission current is not significantly affected by the transistor circuit that includes the current sensor 219.

The HCIG of FIG. 2A has no dead times such as the intervals 132a and 132b illustrated in FIG. 1B. Thus, all pressure measurements with the HCIG of FIG. 2A are valid and calibrated at any given time. If a different, more optimal electron emission current is desired for any reason, the microcontroller (not shown in FIG. 2A) can simply send a different command 209 to the cathode heating power supply $V_H$ to change the electron emission current with no significant effect on cathode bias voltage. The electron emission current can have any one of a continuous range of values as a function of cathode power, and there is no limitation to a small set of pre-selected values, as in FIG. 1A. Similarly, the cathode bias voltage can be easily and quickly changed by changing the control voltage to the base of transistor 221 without affecting electron emission current.

In other embodiments, the transistor circuit can be configured to control cathode bias voltage with only certain discrete values. However, it is preferable to allow a transistor circuit, as in the transistor circuit of FIG. 2A, to variably control cathode bias voltage over a continuous range of values limited only by the digital resolution of the microcontroller. Pressure measurements continue to be valid, even while cathode temperature rises or falls to different values with changes in electron emission current. Thus, FIG. 2A illustrates how embodiments of the invention can be used to measure the pressure with an ionization gauge, even while changing the electron emission current from one value to another.

Figure 2B:
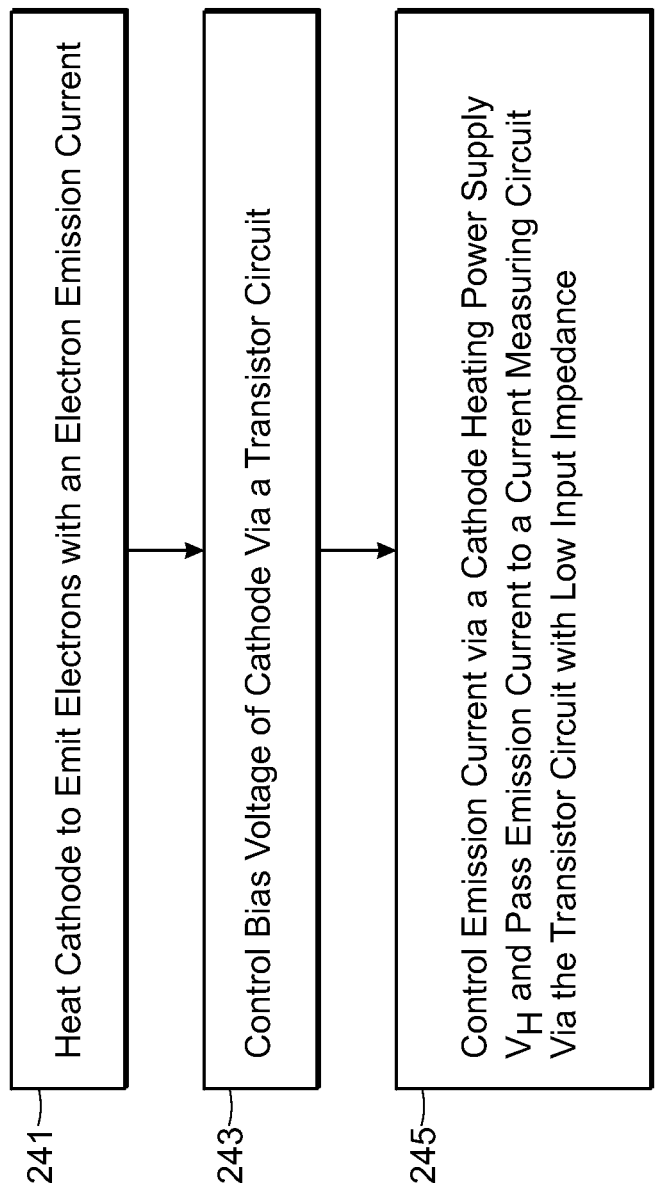
FIG. 2B is a flow diagram illustrating an embodiment method of operating an ionization pressure gauge such as that shown in FIG. 2A.

FIG. 2B is a flow diagram illustrating a method of operating an ionization pressure gauge such as the gauge illustrated in FIG. 2A. At 241, the cathode 208 is heated to emit electrons with an electron emission current $i_e$. At 243, cathode bias voltage $V_C$ is controlled via a transistor circuit. In FIG. 2A, for example, the transistor circuit 220 comprises the transistor 221 and current sensor 219. At 245, electron emission current $i_e$ is controlled via $V_H$ and passed to a current measuring circuit via the transistor circuit with low input impedance. In FIG. 2A, the current measuring circuit includes the current sensor 219. In other embodiments, the current measuring circuit can include any number of components or device that are configured to measure electron emission current.

The circuit implementation that is illustrated in FIG. 2A is a common-gate MOSFET amplifier. However, other implementations could present best practice for various other design situations. Example alternatives include a common-gate JFET amplifier, a common-base bipolar transistor amplifier, and a transimpedance amplifier. All implementations have in common an input impedance that is substantially zero and a voltage output that is proportional to the electron emission current. However, bipolar transistor implementations are less preferred because some of the electron emission current flows through the transistor base and is unaccounted for at the current sensor 219. FET implementations, for example, do not have this drawback and are, thus, preferred over bipolar transistor implementations.

Figure 3A:
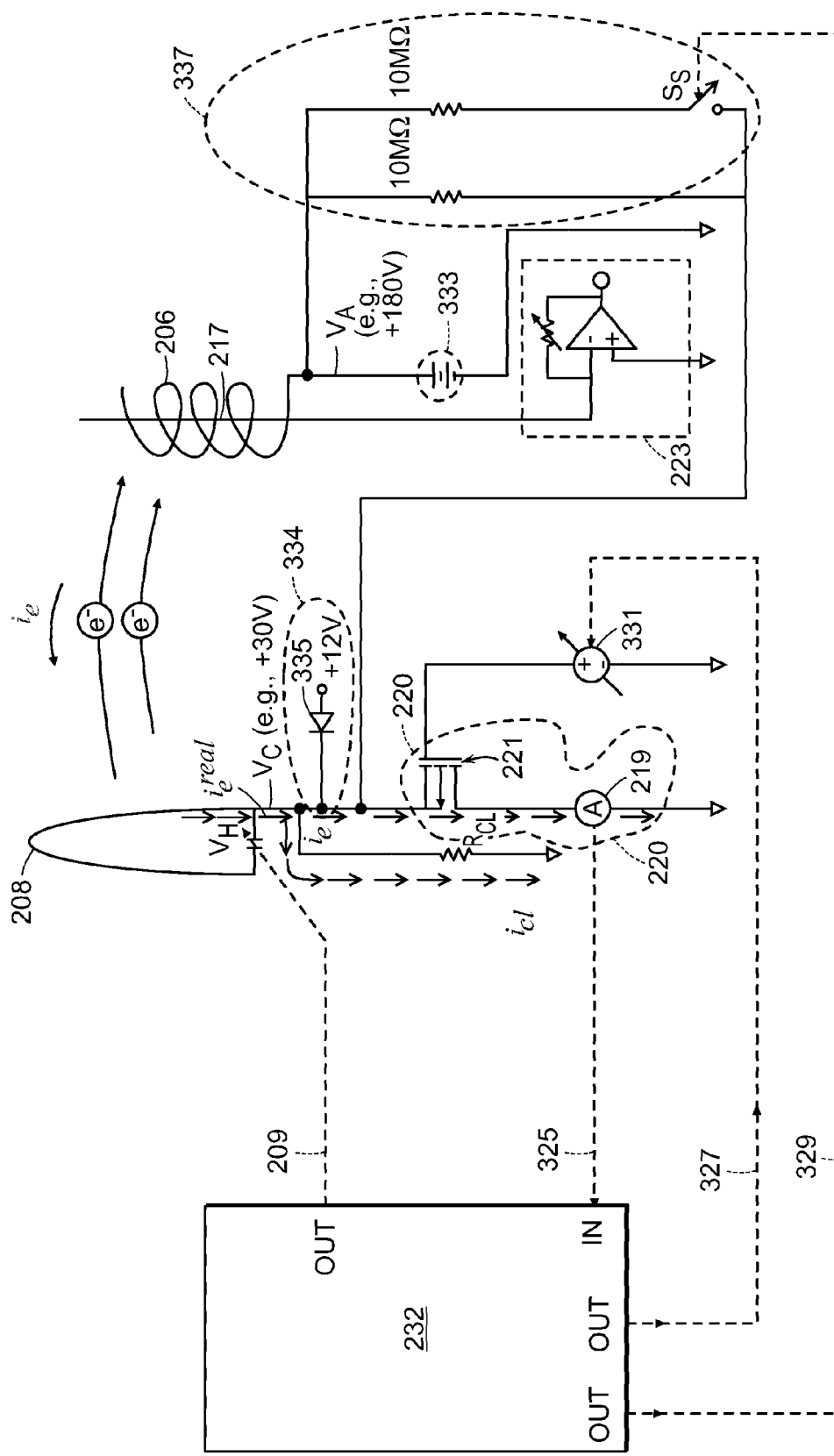
FIG. 3A is a schematic diagram illustrating an alternative embodiment HCIG with a FET transistor circuit to pass the electron emission current, a microcontroller, and circuitry for leakage current mitigation.

FIG. 3A is a schematic diagram illustrating an HCIG circuit in which the direct bias of the FET 221 of FIG. 2A is replaced by a variable voltage source 331. The variable voltage source 331 has a cathode bias voltage control input to receive a gate control signal 327 from the microcontroller 232. The variable voltage source 331 is thus controlled by the microcontroller 232 to control bias voltage of the transistor 221 gate (control terminal). While the variable voltage source 331 is used in the embodiment of FIG. 3A, a direct input from the microcontroller or a fixed voltage source can be used in other embodiments. As in FIG. 2A, the FET has an offset voltage between the source reference terminal and the gate control terminal that is not sensitive to electron emission current, so the cathode bias voltage can be precisely set by the gate voltage plus offset. Also, the electron emission current sees a substantially zero input impedance for the advantages discussed above.

The variable voltage source 331, in combination with an offset circuit 334 including a diode 335 to +12 V, allows precise calibration of the FET offset voltage $V_{GS}$. Specifically, the cathode bias voltage of the cathode 208 is equal to a voltage applied to a gate of the FET (via the power source 331) plus an offset voltage of the FET 221. The diode 335 is electrically connected to the transistor circuit to facilitate detection of the offset of the FET transistor 221. The diode voltage drop is well defined. With zero cathode heating power and zero actual electron emission current, the gate voltage to FET 221 can be gradually decreased until current is sensed at 219. At that point, the FET source gate offset is the difference between (+12.0 V minus the diode voltage) and the gate voltage 331. The offset voltage is relatively constant over a wide range of source (emission) currents. This allows the voltage at the bottom of the cathode to be set very accurately to +30 V, for example, even though there is no direct measurement of the +30 V node. Avoiding any direct measurement of the +30 V node is a useful feature of this embodiment, because any direct measurement of the node's voltage will drain some non-zero current, which can result in an electron emission current measurement error. In the embodiment of FIG. 3A, the diode 335 is the only component of the offset circuit 334 that detects the transistor 221 offset. However, in other embodiments, an alternative offset circuit can include any number of components that, separately or in combination with each other, are configured to detect the offset of the transistor 221.

Even without the diode 335, pressure measurements using the HCIG in FIG. 3A may have accuracy within about 5%, for example. However, with the benefits of calibrating the FET offset voltage using the diode 335, theoretical pressure measurement accuracy is within about 1%, for example. It should be noted that, while the diode approach to calibrating the FET offset is very compact and economical, alternative approaches to calibration can also be used. Also, although less preferred, the actual cathode bias voltage may be measured, instead of setting the FET gate voltage to the desired cathode bias voltage minus the FET offset voltage. This alternative approach also allows the cathode bias voltage to be very accurate without calibration of FET. However, in this alternative approach, electron emission current accuracy can be decreased somewhat due to some electron emission current flowing into the cathode bias voltage measurement circuit.

The microcontroller 232 monitors current flowing through the current sensor 219 via an electrical input 325 electrically output and connected from the current sensor 219. Specifically, an electron emission current monitor input 325 is used by the microcontroller 232 to read the current sensor 219.

FIG. 3A also illustrates how leakage current can be mitigated using embodiments of the invention. HCIGs typically have one or more electrical feedthroughs that carry signals between each of the cathode and anode, for example, and the outside of the HCIG. For example, the electron emission current $i_e$ is carried by one such feedthrough pin. These pins are insulated from a gauge header housing and other paths to ground by feedthrough insulators. However, over time, conducting coatings can form on feedthrough insulators, which can result in low impedance paths for leakage current. For example, the coatings can reduce the equivalent resistance from feedthrough pins to the header housing of the gauge from teraohms (TΩ) to megaohms (MΩ) and even less in some cases, and the reduced impedance can allow leakage currents to develop between internal electrodes and the header housing or other paths to ground. Insulators can get coated through a variety of physicochemical processes. Line of sight deposits of material sputtered from internal surfaces of the gauge can lead to the development of conductive coatings. Decomposition of precursor gases via thermal or electron impact processes can produce by-products that can bind to the insulators and also allow conduction of electrical current in feethrough insulators. The conductivity of the deposited coatings can also be enhanced by additional decomposition of the coatings if the feedthroughs operate at elevated temperatures. The contamination on cathode electrical feedthrough insulators can become conductive by this surface decomposition mechanism because they typically run hotter than the rest of the electrical feedthroughs, for example. Cathode feedthroughs are usually hotter because they are firmly connected to the incandescent cathode and often exhibit the largest level of contamination in the header.

As contamination increases, contamination can build up and can ultimately cause a gauge to fail (e.g., by cathode degradation). Contamination is also responsible for leakage currents, which cause inaccuracies if ignored. Leakage currents limit the minimum practical electron emission currents that can be used in HCIGs, limiting the upper pressure at which HCIGs can be operated. Leakage currents can also limit the lower pressure at which HCIGs can be operated due to the need to measure very low ion currents at these pressures.

FIG. 3A illustrates one such leakage current path, which redirects some current from the electron emission current path. This current is represented by $i_{CL}$, flowing through a resistance $R_{CL}$ that arises from the feedthrough insulator contamination (shown as $R_{CL}$). Using the procedure described hereinafter in conjunction with FIG. 3B, the effects of the leakage current $i_{CL}$ can be canceled out such that the microcontroller 232 can obtain an indication of the real electron emission current $i_e^{real}$. The procedure described hereinafter in conjunction with FIG. 3C makes use of an additional current supply, a leakage test current source 337, that connects to the electron emission current path as shown in FIG. 3A. The embodiment of FIG. 3A makes use of the anode power supply 333 as a convenient source of current. In other embodiments, current may be provided by a separate power supply, such as a transistor current source, or by a different power supply already present in the system.

In FIG. 3A, two resistors, a 1 MΩ resistor and a 10 MΩ resistor, are electrically connected to the anode power supply 333 in parallel, forming the leakage test current source 337. Thus, the leakage test current source 337 includes a resistance coupled to the anode bias supply. In turn, the MOSFET transistor 221 is electrically connected to the leakage test current source 337 to enable current flow through the transistor 221 even with the electron emission current set to zero. Current is allowed to flow through either the 10 MΩ resistor alone, or the 10 MΩ and 1 MΩ resistors in parallel, to the electron emission current path, depending upon the position of a leakage current range selection switch $S_s$, which is controlled by the microcontroller 232 via an electrically connected leakage current range selector signal 329. The switch $S_s$ is configured to switch a current range of the leakage test current source 337 in accordance with the level of leakage current $i_{CL}$, as further described hereinafter. The switch $S_s$ allows more accurate cancellation of leakage currents over a wider range of leakage resistance. However, in other embodiments, moderately accurate cancellation over a moderate range of leakage resistance $R_{CL}$ can be performed with the 10 MΩ resistor or a different resistor alone. Use of the leakage test current source 337 is described below with respect to FIG. 3C.

Figure 3B:
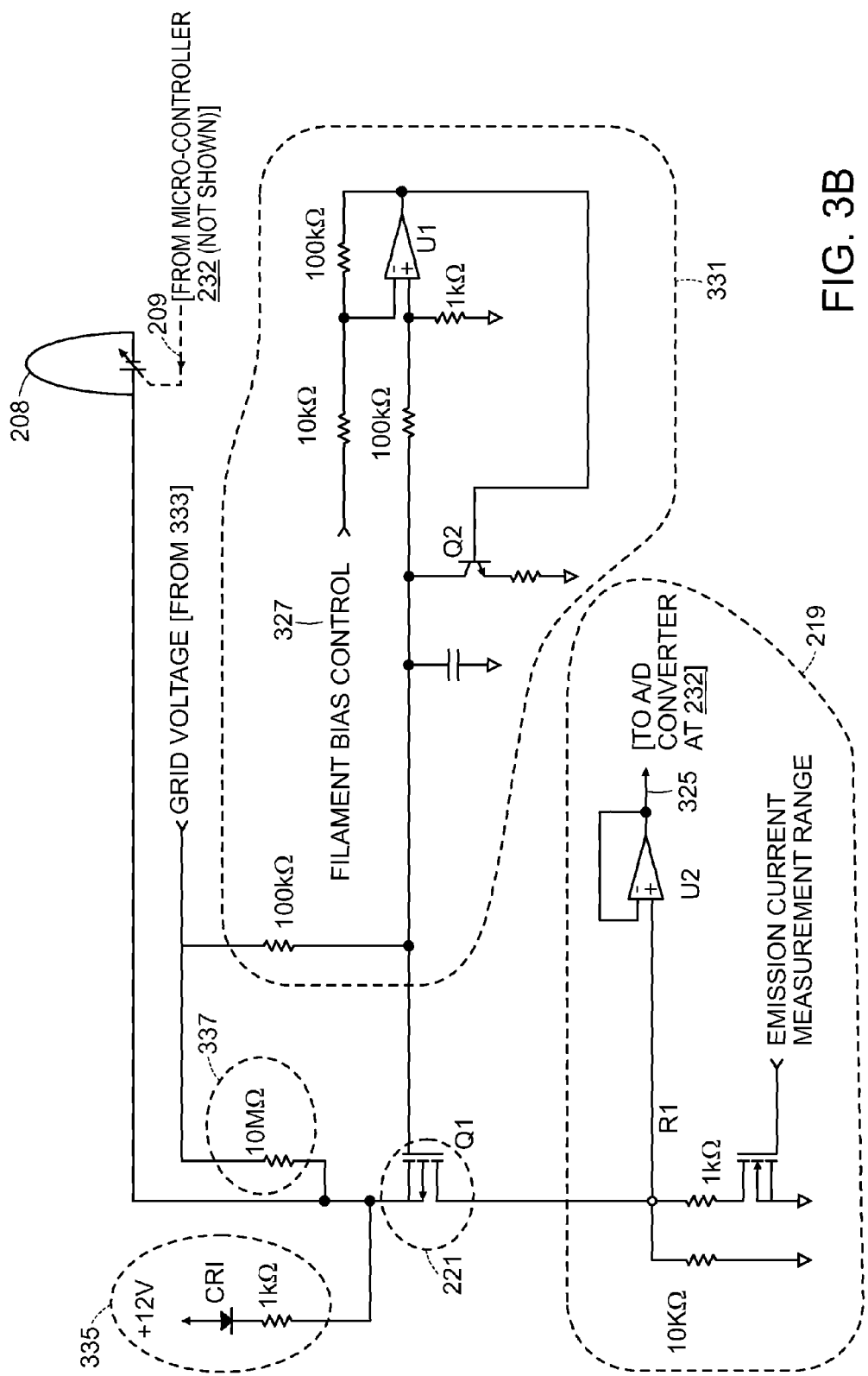
FIG. 3B is a more detailed schematic diagram of the HCIG illustrated in FIG. 3A.

FIG. 3B is a schematic diagram of the embodiment HCIG from FIG. 3A. The microcontroller 232 in FIG. 3A is not shown in FIG. 3B. However, various signals to and from the microcontroller 232 are illustrated in FIG. 3B. Sections of the schematic diagram in FIG. 3B that correspond to features in the HCIG of FIG. 3A are labeled with the same reference numbers.

The leakage current source 337 in FIG. 3B shows one 10 MSΩ resistor as shown in FIG. 3A. The switch $S_S$ of FIG. 3A is not implemented in this schematic. As illustrated in the upper right of FIG. 3B, the cathode bias voltage for the filament 208 is provided by a connection to the FET cathode.

The variable gate voltage controller 331 receives the control signal 327 from the microcontroller 232 illustrated in FIG. 3A. The output of operational amplifier (op amp) U1 in controller 331 drives the base of transistor Q2. The non-inverting input of U1 is a feedback voltage to ensure proper setting of the FET gate control voltage. The output of the op amp U1 is then stepped up to a range that may cover 10V to 50V before being applied to the gate of FET 221.

At the current sensor 219, an op amp U2 senses electron emission current and buffers input voltage, and the output 325 is connected to the microcontroller 232. Resistor R1 is a switchable current sense resistor used for a different current range.

The optional diode 335 illustrated in FIG. 3A is CR1 in FIG. 3B. While the FET source voltage is nominally 1.5V higher than the gate voltage, this value can vary due to component tolerances. By adjusting the set gate voltage while reading current at the current sensor 219 (while there is no real electron emission current) and slowly decreasing set gate voltage until electron emission current begins to flow, the offset can be known with greater precision, and the cathode bias voltage can be set with greater precision.

Figure 3C:
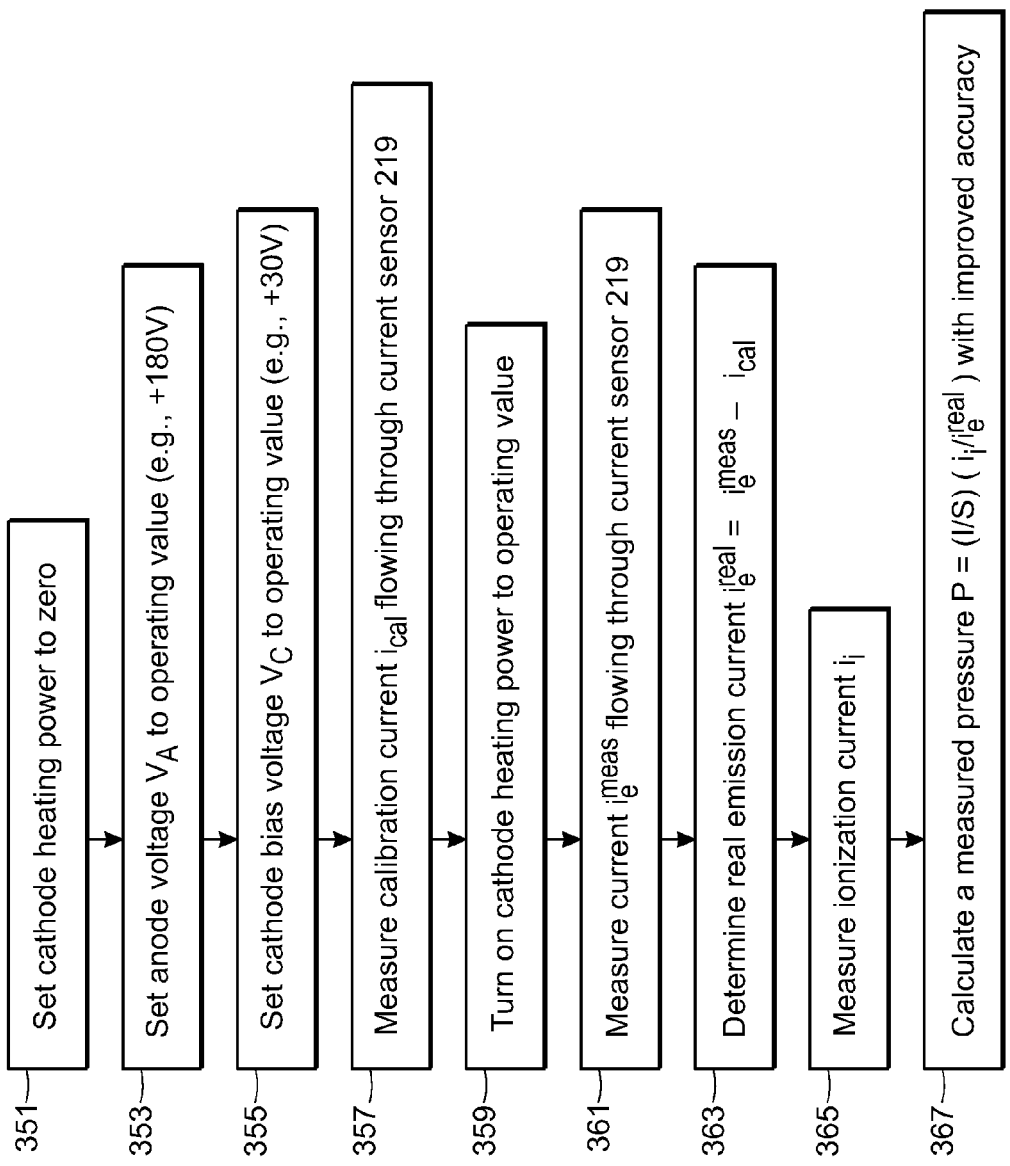
FIG. 3C is a flow diagram illustrating an embodiment method of mitigating the effect of leakage current.

FIG. 3C is a flow diagram illustrating an example procedure that can be used to measure and cancel the effects of leakage current in the HCIG illustrated in FIG. 3A. At 351, the cathode heating power is set to zero via the cathode heating power control 209. Under this condition, no emission can occur from the cathode 208. At 353, the anode voltage $V_A$ is set to the normal operating value (e.g., +180 V). At 355, the cathode bias voltage $V_C$ is set to the normal operating value (e.g., +30 V). At 357, a calibration current $i_{cal}$ flowing through the current sensor 219 is measured and recorded by the microcontroller 232. Note that the resistance between the anode and FET source is $R_s$. In the case in which the switch $S_S$ is open, $R_s$=10 MΩ. In this case, all the current $i_{cal}$ measured at the current sensor passes through the 10 MΩ resistor of the current source 337. Some fraction of the current from the 10 MΩ resistor flows through the leakage resistor $R_{CL}$, while the remainder flows down through the MOSFET 221 and current sensor 219. It is not necessary to know the fractional currents flowing through these two paths with this calibration method. The leakage current can be calculated as the difference between current through $R_s$ and that sensed as $i_{cal}$, or $i_{CL}=[(V_A-V_C)R_S]-i_{cal}$, and the leakage resistance can be calculated by $R_{CL}=V_C/i_{CL}$.

Continuing to refer to FIG. 3C, at 359, the cathode heating power supply $V_H$ is turned on to its normal operating value. Emission from the cathode 208 then occurs, and normal operation of the HCIG begins. At 361, a current $i_e^{meas}$ flowing through the current sensor 219 is measured and recorded by the microcontroller 232. Because the cathode bias voltage $V_C$ is the same as when the calibration current $i_{cal}$ was measured, the current through the leakage path remains $i_{CL}$=30 V/$R_{CL}$. Any actual electron emission current will flow entirely down through the FET 221 and current sensor 219 for the measurement of $i_e^{meas}$. At 363, the microcontroller 232 determines a real electron emission current $i_e^{real}=i_e^{meas}-i_{cal}$ because $i_{cal}$ contains flow through $R_S$. Thus, the microcontroller 232 calculates a difference between electron emission current measured with the cathode heated and electron emission current measured with a cathode unheated, and the difference is thus used for calibration of the ionization pressure gauge with respect to a leakage current, namely removing the effects of leakage current $i_{CL}$ from measurements of electron emission current $i_e$. The real electron emission current $i_e^{real}$ thus has the effect of leakage current removed.

Furthermore, pressure measured by the ionization pressure gauge can be calculated and reported with improved accuracy, because the measured pressure can also have the effect of leakage current removed. As further illustrated in FIG. 3C, at 365, the ionization current $i_i$ is measured. At 367, a pressure is calculated by the microcontroller 232 according to the equation for pressure P described hereinabove, except that the real electron emission current $i_e^{real}$ is used as follows: $P=(1/S)(i_i/i_e^{real})$. Thus, using the embodiment apparatus and method of FIGS. 3A-3C, respectively, for example, the HCIG can be tested for the effects of leakage current. This can be done even with the gauge under vacuum, in situ in its normal environment of use. The leakage current is tested for by measuring $i_{cal}$, which reflects the leakage current. The leakage current can then be responded to, for example, by subtracting out its effects within the microcontroller 232 as described hereinabove, thus increasing pressure measurement accuracy.

Preferably, the total current through the 10 MΩ resistor or both of the resistors in parallel is slightly greater than the leakage current $i_{CL}$. In that case, $i_{cal}$ is close to zero, and a $i_e^{meas}>>i_{cal}$, and smaller errors will accumulate in the subtraction operation. The switch $S_s$ allows one of two different leakage cancellation currents to be selected. $S_s$ will typically be open, but it can be closed, for example, when the leakage current $i_{CL}$ exceeds $V_C$/10 MΩ. Thus, the switch $S_S$ is configured to switch the current range of the leakage test current source in accordance with a level of leakage current.

It should be understood that an exact leakage current cancellation can be performed in many other ways using circuits similar to the circuit in FIG. 3A, with various modifications. For example, a variable and programmable leakage current source can be used in place of the current source 337. Such a programmable leakage current source can be adjusted, for example, until it reaches a minimal resolvable current level greater than zero, measured at the current sensor. In this case, current measurements at the current sensor 219 will be the actual electron emission current. Also, in some embodiments, the cathode heating power need not be turned off during a measurement of $i_{cal}$. For example, the anode voltage $V_A$ can be temporarily turned off to cause electron emission current to be zero, without a need to cool the cathode. These embodiments have the advantage that measurements of $i_{cal}$ can be performed very quickly, with less interruption of the operation of the HCIG.

In addition to calibrating for leakage current as described in connection with FIGS. 3A and 3C, there are many alternative devices and methods that can be used to calibrate an HCIG with respect to leakage current. Various alternative devices and methods are described in the U.S. patent application Ser. No. entitled "Devices and Methods for Feedthrough Leakage Current Detection and Decontamination in Ionization Gauges," which is identified by 14/795, 706, which is being filed on even date herewith, and which lists inventors Stephen C. Blouch, Paul C. Arnold, Gerardo A. Brucker, Wesley J. Graba, and Douglas C. Hansen. The teachings of the aforementioned Application and any other patents, published applications, and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. For example, the single transistor of the transistor circuit could be replaced with a more complicated transistor circuit.

What is claimed is:

1. An ionization pressure gauge comprising:
   a cathode configured to be heated to emit electrons with an electron emission current;
   a transistor circuit configured to pass the electron emission current with low input impedance and to control cathode bias voltage of the cathode; and
   circuitry configured to detect ion current resulting from the emitted electrons and to provide an indication of pressure based on the ion current.

2. The ionization pressure gauge of claim 1, wherein the low input impedance is substantially zero.

3. The ionization pressure gauge of claim 1, wherein the transistor circuit controls cathode bias voltage independent of magnitude of the electron emission current.

4. The ionization pressure gauge of claim 1, further comprising a variable heating power source that variably heats the cathode.

5. The ionization pressure gauge of claim 1, the transistor circuit comprising a field effect transistor (FET) that passes the electron emission current through its source and controls cathode bias voltage with applied gate voltage.

6. The ionization pressure gauge of claim 5, wherein cathode bias voltage is equal to a voltage applied to a gate of the FET plus an offset voltage of the FET.

7. The ionization pressure gauge of claim 5, wherein a gate of the FET is electrically connected to a variable voltage source to variably control cathode bias voltage.

8. The ionization pressure gauge of claim 1, further comprising a circuit that detects an offset of a transistor in the transistor circuit.

9. The ionization pressure gauge of claim 8, wherein the circuit that detects the offset of the transistor includes a diode electrically connected to the transistor circuit.

10. The ionization pressure gauge of claim 1, the transistor circuit comprising a current sensor that measures the electron emission current through a transistor in the transistor circuit.

11. A method of operating an ionization pressure gauge, the method comprising:
    heating a cathode to emit electrons with an electron emission current;
    controlling cathode bias voltage of the cathode via a transistor circuit;
    passing the electron emission current via the transistor circuit with low input impedance; and
    detecting ion current resulting from the emitted electrons and providing an indication of pressure based on the ion current.

12. The method of claim 11, wherein the low input impedance is substantially zero.

13. The method of claim 11, cathode bias voltage controlled independent of magnitude of the electron emission current.

14. The method of claim 11, wherein heating the cathode includes variably heating to emit the electrons with a variable electron emission current.

15. The method of claim 11, wherein the transistor circuit includes a field effect transistor (FET) that passes the electron emission current through its source and controls cathode bias voltage with applied gate voltage.

16. The method of claim 15, wherein cathode bias voltage is equal to a voltage applied to a gate of the FET plus an offset voltage of the FET.

17. The method of claim 15, wherein controlling cathode bias voltage includes applying a variable voltage source to a gate of the FET.

18. The method of claim 11, further comprising calibrating the transistor circuit by detecting an offset of a transistor in the transistor circuit.

19. The method of claim 18, wherein detecting the offset of the transistor includes using a diode.

20. The method of claim 11, further comprising using a current sensor to measure the electron emission current through a transistor in the transistor circuit.

21. The method of claim 11, further comprising changing the electron emission current from one value to another without dead time in pressure measurement.

22. An ionization pressure gauge comprising:
    means for heating a cathode to emit electrons with an electron emission current;
    means for controlling cathode bias voltage of the cathode via a transistor circuit;
    means for passing the electron emission current via the transistor circuit with low input impedance; and
    means for detecting ion current resulting from the emitted electrons and for providing an indication of pressure based on the ionization current.

23. An ionization pressure gauge comprising:
    a cathode configured to be heated to emit electrons with an electron emission current; and
    a transistor circuit configured to pass the electron emission current with low input impedance and to control cathode bias voltage of the cathode, the transistor circuit comprising a field effect transistor (FET) that passes the electron emission current through its source and controls cathode bias voltage with applied gate voltage, and wherein cathode bias voltage is equal to a voltage applied to a gate of the FET plus an offset of the FET.

24. A method of operating an ionization pressure gauge, the method comprising:
    heating a cathode to emit electrons with an electron emission current;
    controlling cathode bias voltage of the cathode via a transistor circuit that includes a field effect transistor (FET), controlling including applying gate voltage to a gate of the FET, wherein cathode bias voltage is equal to gate voltage plus an offset voltage of the FET; and passing the electron emission current via the transistor circuit through a source of the FET with low input impedance.

\* \* \* \* \*